Nov. 13, 1928.  
E. BURKE ET AL  
1,691,045  
DEVICE FOR CUTTING TUBES  
Filed Oct. 4, 1923  
2 Sheets-Sheet 2
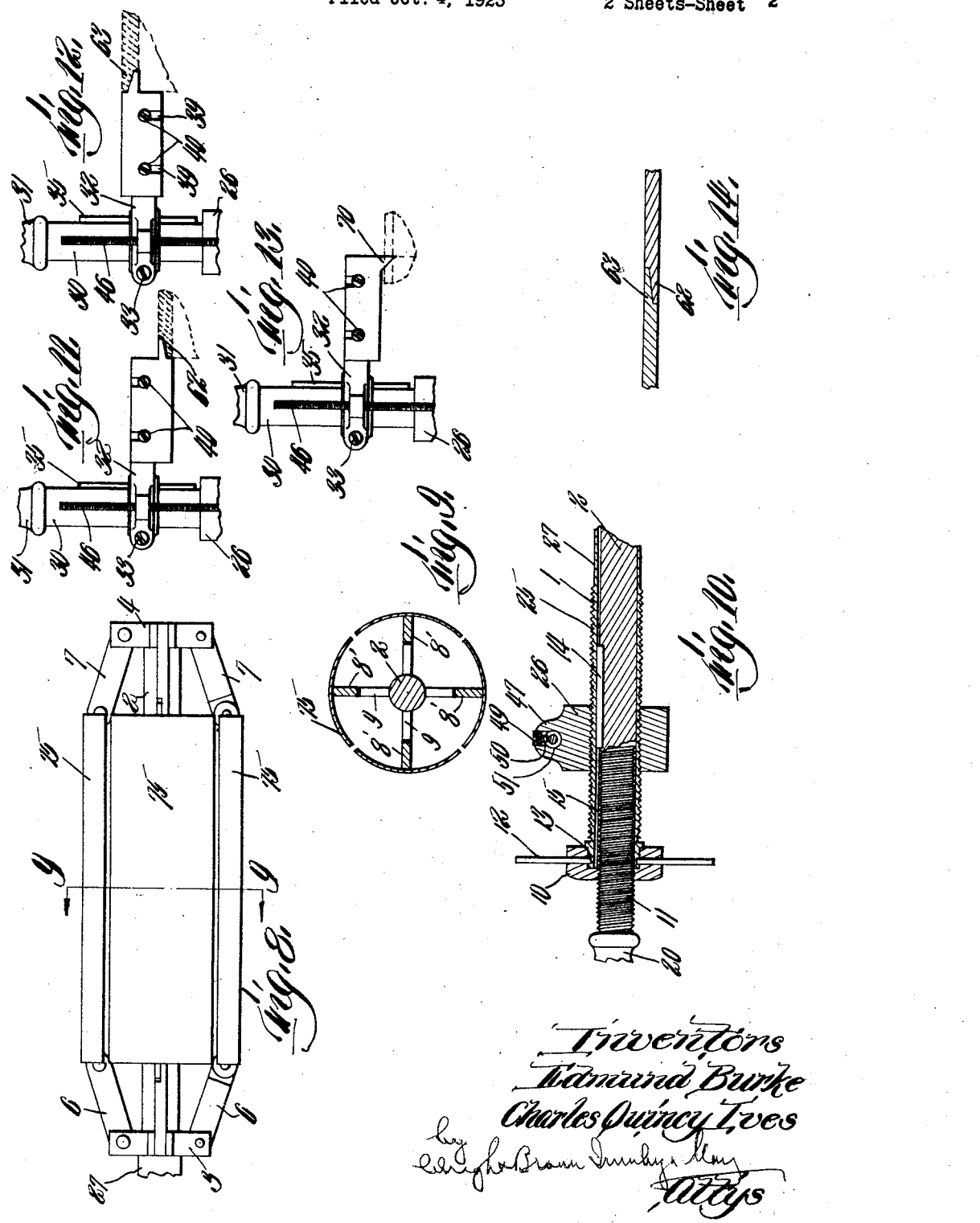

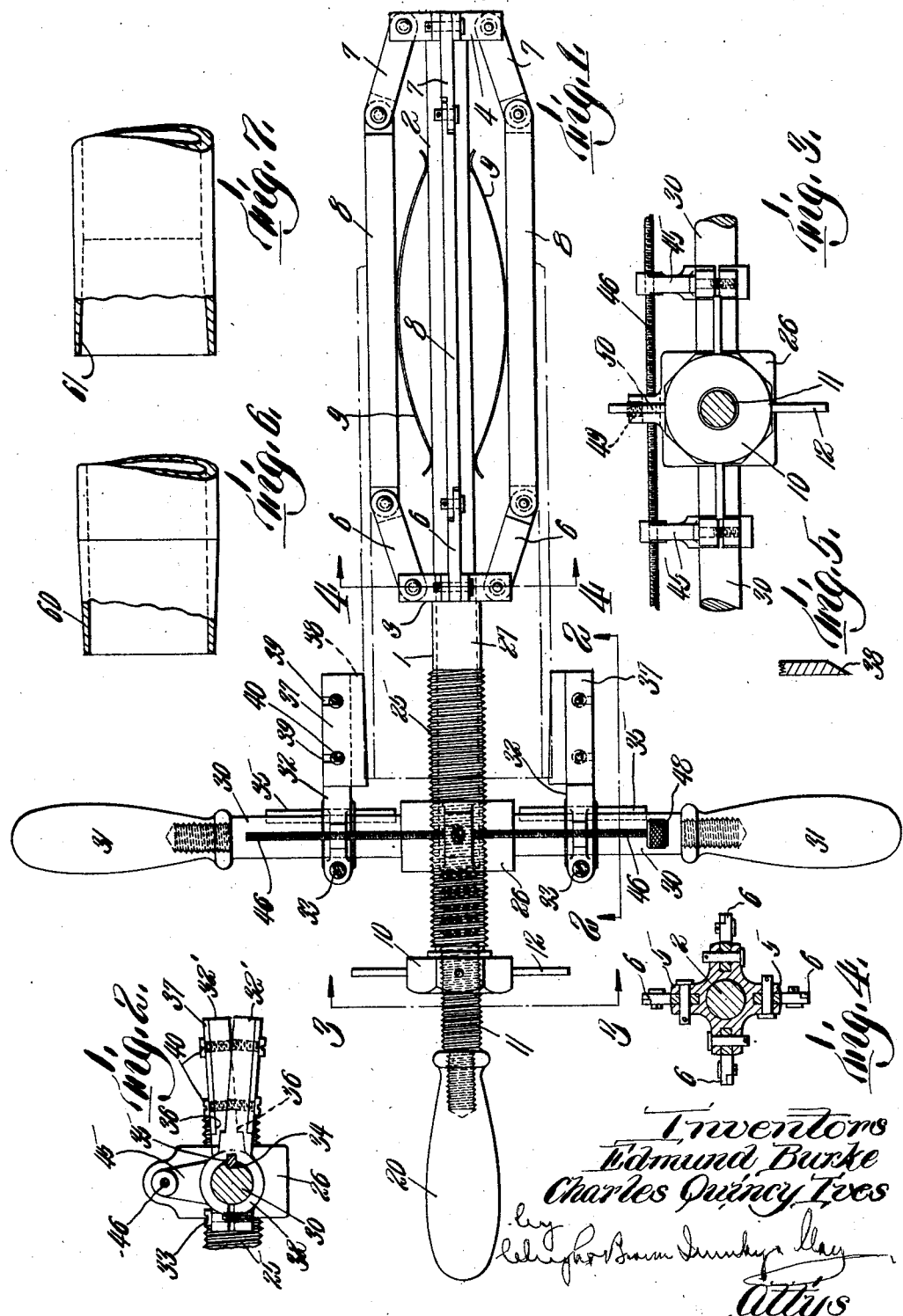

Patented Nov. 13, 1928.

1,691,045

UNITED STATES PATENT OFFICE.

EDMUND BURKE AND CHARLES QUINCY IVES, OF PORTLAND, MAINE, ASSIGNORS TO BROWN COMPANY, OF BERLIN, NEW HAMPSHIRE, A CORPORATION OF MAINE.

DEVICE FOR CUTTING TUBES.

Application filed October 4, 1923. Serial No. 666,462.

This invention relates to devices for cutting in scarf or other formation the ends of tubes or pipes, and has been more especially designed, though not restricted to such use, to operate on non-metallic tubes, such for example as those formed from paper pulp treated with hardening and liquid-proofing agents.

The device of this invention is easily portable so that it may be used where such tubes or pipes are being installed, for the purpose of forming their ends to the desired configurations for joining them end to end or for other purposes.

The device, therefore, comprises a member engageable with the pipe to be cut and mechanism carried thereby which may be actuated to perform the cutting operation.

For a more complete understanding of this invention, reference may be had to the accompanying drawings in which Figure 1 is a side elevation of the device.

Figures 2, 3 and 4 are detail sections on lines 2—2, 3—3 and 4—4, respectively, of Figure 1.

Figure 5 is an end view of a scarfing knife.

Figures 6 and 7 are fragmentary views showing formations of scarfs for mating pipe ends.

Figure 8 is a view similar to a portion of Figure 1, but illustrating a modified form of pipe-engaging and holding means.

Figure 9 is a detail section on line 9—9 of Figure 8.

Figure 10 is a detail section through the tool-feeding and supporting shaft and related parts.

Figures 11, 12 and 13 are fragmentary elevations similar to a portion of Figure 1, but illustrating various tools and corresponding configurations of tube ends.

Figure 14 is a detail section through the joint between two tubes scarfed by the tools shown in Figures 11 and 12.

Referring first to Figures 1 to 4 and 10, it will be seen that the device comprises a sleeve 1 through which is slidably but non-rotatably mounted, a rod 2. For the purpose of preventing relative rotation between the rod and the sleeve a key 14 is shown which extends laterally from the rod 2 inwardly of the threaded portion and engages a key slot 15 in the inner wall of the sleeve 1. The sleeve and rod carry elements which may be expanded into close contact with the inner wall of the pipe or tube to be cut so that the sleeve and rod are arranged coaxially therewith in position to support the cutting devices as will later appear. Such expanding clamping means comprises a collar 3 fixed to the inner end of the sleeve 1 and a similar collar 4 fixed to the inner end of the rod 2, both these collars being formed with radially extending forked jaws 5 between which are pivoted the ends of arms 6 and 7. The outer ends of these arms are connected in pairs, each arm 6 being connected to the corresponding arm 7 by links 8 pivoted at opposite ends to these arms and forming a toggle therewith. As shown four such links 8 are employed but more or less could be used as desired, three being the minimum for best results. The links 8 are normally urged outwardly from the rod 2, resilient leaf springs 9 interposed between the inner edges of these links and the rod 2 being shown as employed for that purpose. It is evident that by moving the rod 2 outwardly, causing the collar 4 to approach the collar 3, the links 8 are forced outwardly, and that inward motion of the rod 2 relative to the sleeve 1 causes the collar 4 to move away from the collar 3 and retracts the links 8 until they are in alinement with the arms 6 and 7. Motion of the rod 2 relative to the sleeve 1 may be effected by turning a nut 10 threaded on an externally threaded portion 11 thereof and rotatable on the outer end of the sleeve 1. As shown this nut 10 has outwardly extending posts or pins 12 which may be grasped to facilitate turning of the nut, these posts or pins, as shown best in Figure 10, extending into a circumferential groove 13 in the periphery of the sleeve 1 adjacent its outer end. By this means the nut is retained against axial movement relative to the sleeve. By manipulation of the nut 10, therefore, the sleeve and rod may be clamped in axial relation to the pipe or tube, the links 8 being expanded into clamping engagement with the inner walls thereof when it is desired to retain the sleeve and rod into position and being retracted therefrom when it is desired to remove the device from the pipe. The outer end of the rod 2 may be provided with a handle 20 to facilitate the insertion and withdrawal from the tube of the clamping mechanism. The sleeve 1 is adapted to receive tool-holding devices for tools which may be manipulated to form the tube ends as may be desired.

It may be desirable to effect a feed movement of the tools axially of the work, or it may be desired, as when cutting off the tube, to hold the tools stationary axially thereof while permitting them to be rotated to carry them about the periphery of the work. In order that these two actions may take place at will, the outer end of the sleeve, as at 25, is threaded, and in engagement with the threads thereof is an internally threaded block 26. Inwardly from the portion 25 the sleeve 1 has an unthreaded portion 27 which is of sufficient length up to the sleeve 3 to permit the block 26 to be rotated freely thereon. This construction also acts as an automatic stop for a scarfing tool as the end of the tube to be operated on can be set with respect to the smooth portion 27 so that the cutter will be fed along the tube to a certain point at which it will cease to advance, this cessation taking place when the block 26 moves off the threaded portion 25 and on to the smooth portion 27 of the sleeve 1. When this block is in position to ride on the threaded portion 25, rotation thereof, of course, imparts a traverse thereof lengthwise of the sleeve, but when it rotates on the portion 27 it is not traversed. This block 26 may have fixed thereto one or more radially extending bars 30, which may, if desired, be provided with handles 31 at their ends to facilitate the turning of the bars and the block 26 about the center of the sleeve 1 as an axis. Adjustable lengthwise of each bar 30 is a tool carrier 32, which, as shown more particularly in Figure 2, may comprise a split sleeve which may be tightened on the corresponding bar when in proper adjusted position by means of a clamping screw 33. This collar is provided with a keyway 34 within which rides a long key 35 extending lengthwise of the corresponding bar 30 which acts to retain the tool holder from rotation relative to the bar. Fixed to or integral with the sleeve 32 is an arm 32' having on opposite faces a cutout portion 36 which forms a seat for a cutting tool 37.

As shown best in Figures 1 and 5 the cutting tool 37 may comprise a blade having a beveled cutting edge as at 38 and provided with a pair of slots 39 through which may pass screws 40 by which the knife may be fixed in position in either of the cutout portions 36. The two cutout portions are provided to avoid the necessity of forming right and left hand holders for operating on opposite sides of the central axis of the pipe, for work of this kind it being found advisable to have the knives trail and act with a scraping effect rather than by direct cutting. The knives are therefore set on their holders in a manner to give the desired bearing thereof on the work, depending on the direction of rotation which it is desired to impart thereto by manipulation of the handles 31. It will be noted also from an inspection of Figure 1 that the tools on opposite sides of the axis of the sleeve face in opposite directions, being placed on relative opposite sides of their respective tool holders. While a pair of tool holders has been shown, it is evident that more or less than two might be employed if desired.

Means are provided by which the tool holders may be moved simultaneously and equally toward and from the axis of a tube in order to provide for various diameters of tube and also to effect inward feed movement of the knives after they have begun to operate on the tube. For this purpose each of the tool carriers has preferably integral with the sleeve portion 32, an arm 45 threaded to receive an adjusting screw or threaded rod 46. This screw is oppositely threaded at opposite ends and is journaled at its central portion in an extension 47 of the block 26. By turning this screw, therefore, it is evident that the tool carriers will be moved toward and from each other to effect the desired adjustment or feed movement of the tool. This turning motion may be effected by means of a knurled head 48 at one end of the rod 46. This rod may be prevented from endwise movement relative to the block 26 by means of a screw 49 threaded in the upper end of the portion 47 and provided at its inner end with a pin portion 50 engaging in a circumferential groove 51 in the rod.

By the use of suitably formed tools the ends of the pipes may be scarfed as shown in Figures 6 and 7, the end of one tube, as in Figure 6, being tapered externally as shown at 60 and the inner face of the adjacent tube being complementally tapered as at 61 in Figure 7. Likewise as shown in Figures 11, 12 and 14 the end of one tube may be formed with an externally stepped end 62 and the mating pipe may be formed with a complementally internally stepped end as shown at 63, the position of the tools for cutting these portions being shown in Figures 11 and 12.

In Figure 13 is shown a form of tool which may be used when it is desired to cut off the end of the pipe, this tool, as shown, having a point 70 which may be caused to score the wall of the pipe or tube and be fed thereacross by an axial feed of the knife by turning the threaded rod 46, the block 26 engaging and rotating on the unthreaded portion 27 of the sleeve so that no traverse between the tool and the tube is effected.

In Figures 8 and 9 a slightly modified form of clamping means is disclosed in which the links 8' are provided with curved plates 75 which may bear against the inner face of the tube, these plates being preferably of resilient material slightly flatter than the arc of the surface with which they are to contact so that they may engage this surface over their entire widths when the links 8' are fully expanded.

Having thus described certain embodiments of this invention, it should be evident to those skilled in the art that many changes may be made therein without departing from its spirit or scope as defined by the appended claims.

We claim:

1. A device of the class described comprising a member having a portion of its length threaded, an internally threaded block engageable with the threads of said member and operatively rotatable on both its threaded and unthreaded portions to advance or not to advance along said member while operating on the work according as the block is rotated on the threaded or unthreaded portion of the member, bars extending from said block, a tool carrier adjustable axially of each bar, and means for attaching said member axially of a tube to be operated upon by tools held by said carriers.

2. A device of the class described comprising a sleeve having a portion of its length threaded, an internally threaded block engageable with the threads of said sleeve and operatively rotatable on both its threaded and unthreaded portions, bars extending from said block, a tool carrier adjustable axially of each bar, means for attaching said sleeve axially of a tube to be operated upon by tools held by said carriers, and an element extending through said sleeve for actuating said attaching means.

3. A device of the class described comprising a sleeve, a rod slidable through said sleeve, arms pivoted to the adjacent ends of said sleeve and rod, links connecting the free end of each sleeve arm with the free end of a rod arm, whereby said links are moved in unison from and toward the axis of said sleeve and rod to engage and disengage the inner wall of a tube in which said links are placed, the opposite end of said rod being threaded, a nut engaging the threads of said rods and rotatable on said sleeve in fixed longitudinal relation thereto, whereby the rotation of said nut acts to move said links, and a tool rotatably supported on said sleeve in position to operate on the tube.

In testimony whereof we have affixed our signatures.

EDMUND BURKE.
CHARLES QUINCY IVES.